United States Patent
Ramachandrula et al.

(10) Patent No.: US 8,254,692 B2
(45) Date of Patent: Aug. 28, 2012

(54) DOCUMENT COMPARISON METHOD AND APPARATUS

(75) Inventors: Sitaram Ramachandrula, Karnataka (IN); Anjaneyulu Seetha Rama Kuchibhotla, Karnataka (IN); Gopal Datt Joshi, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 12/030,211

(22) Filed: Feb. 13, 2008

(65) Prior Publication Data

US 2009/0028392 A1 Jan. 29, 2009

(30) Foreign Application Priority Data

Jul. 23, 2007 (IN) .......................... 1594/CHE/2007

(51) Int. Cl.
*G06J 9/36* (2006.01)
(52) U.S. Cl. .................. 382/197; 382/203; 382/219
(58) Field of Classification Search .................. None
See application file for complete search history.

(56) References Cited

U.S. PATENT DOCUMENTS

| | | | |
|---|---|---|---|
| 5,687,253 A * | 11/1997 | Huttenlocher et al. | 382/177 |
| 7,475,061 B2 * | 1/2009 | Bargeron et al. | 1/1 |
| 2008/0144055 A1 * | 6/2008 | Sussmeier et al. | 358/1.9 |

* cited by examiner

*Primary Examiner* — Brian P Werner

(57) ABSTRACT

The method compares a first document 10 and a second document 20. The documents may be scanned in 110,112 or an electronic image formed in other ways 114,116. Each electronic image is then segmented into basic units 14,24 such as words, lines or paragraphs. Differences between the matched basic units 14, 24 are determined and a document 30 representing the differences is created 130 and output 132.

20 Claims, 10 Drawing Sheets

Soft Copy

Thankfully, this happened a few years ago — before I had gone completely digital with my personal photos and videos. I've understandably been a bit neurotic about backing up my media ever since — specifically photos and videos of my three-year-old daughter. And, let me tell you, backing up thousands of photos and hundreds of videos by burning them to individual CDs — and then organizing and cataloging them — can be an incredibly tedious and time-consuming affair. We've all got better things to do in our spare time.

Hard Copy

Thankfully, this happened a few years before — before I had gone digital with my personal photos, songs and videos. I've understandably been a neurotic, impulsive about backing up my media ever since — specifically photos and videos of my three-year-old daughter. And, let us tell you, backing up hundreds of photos and hundreds of videos by burning them to CDs and DVDs — and then organizing and cataloging them — can be a boring and time-consuming affair. We've all got better things to do in our spare time.

Output

| | |
|---|---|
| → | Thankfully, this happened a few years ▓▓▓ ago — before I had gone completely digital |
| → | Thankfully, this happened a few years before ▓▓ — before I had gone ▓▓▓▓▓ digital |
| | with my personal ▓▓▓▓ ▓▓▓ photos and videos. I've understandably been a ▓▓▓▓ |
| | with my personal photos, songs ▓▓▓▓ and videos. I've understandably been a neurotic, |
| | ▓▓▓▓ bit neurotic about backing up my media ever since — specifically photos and videos |
| impulsive | ▓▓ ▓▓▓▓ about backing up my media ever since — specifically photos and videos |
| | ▓▓ of my three-year-old daughter. And, ▓▓ let me tell you, backing up ▓▓▓▓ thousands |
| | of my ▓▓▓ three-year-old daughter. And, let us ▓▓ tell you, backing up hundreds ▓▓▓ |
| | of photos and hundreds of videos by burning them to ▓▓▓ ▓▓▓ individual CDs — |
| | of photos and hundreds of videos by burning them to CDs and DVDs ▓▓▓▓ ▓▓ — |
| | and then organizing and cataloging them — can be ▓▓ ▓▓▓▓ an incredibly tedious and time-cor |
| | and then organizing and cataloging them — can be a boring ▓▓▓▓ ▓▓▓▓ and time-cor |
| | affair. We've all got better things to do in our spare time. |
| | affair. We've all got better things to do in our spare time. |

Fig. 6

As in MLE, finding the parameter values that minimize SSE generally requires use of a non-linear optimization algorithm. Minimization of LSE is also subject to the local minima problem, especially when the model is non-linear with respect to its parameters. The choice between the two methods of estimation can have non-trivial consequences.

In this section, I present an application example of maximum likelihood estimation. To illustrate the method, I chose forgetting data given the recent surge of interest in this topic (e.g., Robin & Wenzel, 1996; Wickens, 1998; Wixted & Robeson, 1991).

to differ from MLE estimates, especially for data that are not normally distributed such as preparation, correct and response time. An implication is that one might possibly arrive at different conclusions about the same data set depending upon which method of estimation is employed in analyzing the data.

Among a half-dozen retention functions that have been proposed and rested in the past, I provide an example of MLE for the two functions, power and exponential. Let w—(w1,w3) be the parameter vector, t.

Suppose that data $y=(y_1,.....,y_m)$ consists of m observations in which $y_i(0 \le y_i \le 1)$ represents an observed proportion of correct recall at time n(i-1,....,m). We are interested in testing the visibility of these models. We do this by fitting each to observed data and examining its goodness of fit.

→

As in MLE, finding the parameter values that minimize SSE generally requires use of a non-linear optimization algorithm. Minimization of LSE is also subject to the local minima problem, especially when the model is non-linear with respect to its parameters. The choice between the two methods of estimation can have non-trivial consequences.

In this section, I present an application example of maximum likelihood estimation. To illustrate the method, I chose forgetting data given the recent surge of interest in this topic (e.g., Robin & Wenzel, 1996; Wickens, 1998; Wixted & Robeson, 1991).

to differ from MLE estimates, especially for data that are not normally distributed such as preparation, correct and response time. An implication is that one might possibly arrive at different conclusions about the same data set depending upon which method of estimation is employed in analyzing the data.

Among a half-dozen retention functions that have been proposed and rested in the past, I provide an example of MLE for the two functions, power and exponential. Let w—(w1,w3) be the parameter vector, t.

Suppose that data $y=(y_1,.....,y_m)$ consists of m observations in which $y_i(0 \le y_i \le 1)$ represents an observed proportion of correct recall at time n(i-1,....,m). We are interested in testing the visibility of these models. We do this by fitting each to observed data and examining its goodness of fit.

Fig. 9

DOCUMENT COMPARISON METHOD AND APPARATUS

RELATED APPLICATIONS

Benefit is claimed under 35 U.S.C. 119(a)-(d) to Foreign application Ser. 1594/CHE/2007 entitled "DOCUMENT COMPARISON METHOD AND APPARATUS" by Hewlett-Packard Development Company, L.P, filed on 23 Jul. 2007, which is herein incorporated in its entirety by reference for all purposes

FIELD OF THE INVENTION

This invention relates to the field of methods and apparatus for comparing two documents, either or both of which may be a physical document on a physical medium such as paper.

BACKGROUND

Systems for comparing two electronic documents are known, and may be incorporated into word processing systems.

There is however a need to compare a printed document with another document, either another printed document or an electronic document. Such a need can arise for example when entering into legal agreements, to check that the paper version finally signed is exactly the same as an electronic or printed version agreed by the parties.

BRIEF DESCRIPTION OF THE DRAWINGS

For a better understanding, embodiments will now be described, purely by way of example, with reference to the accompanying drawings, in which:

FIG. 6 is an example of the input and output of the method;

FIG. 9 illustrates a further alternative embodiment; and

Figure 1:
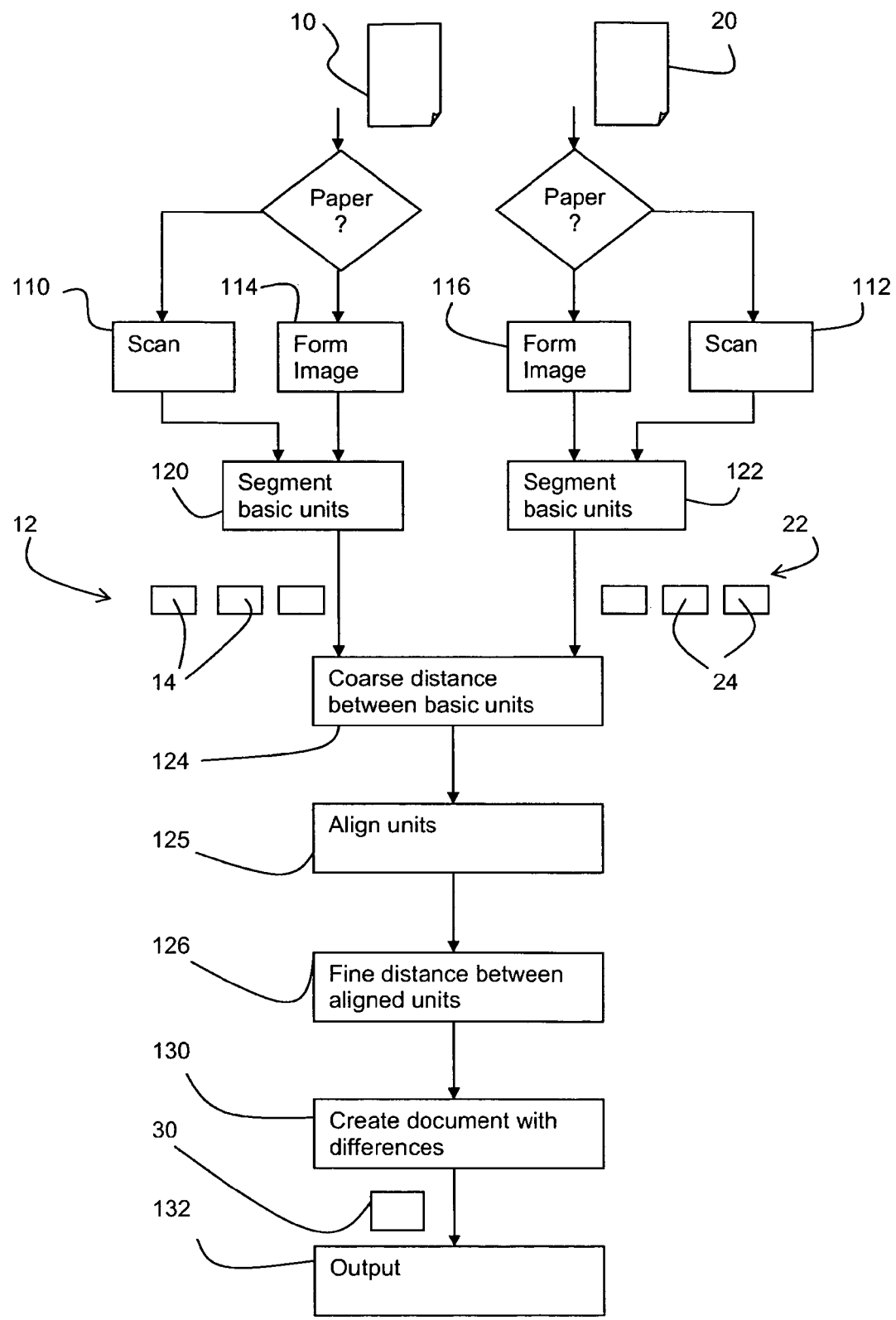
FIG. 1 is a flow diagram of a method of comparing documents.

The drawings are schematic and not to scale.

DETAILED DESCRIPTION

The first example uses a first document 10 and a second document 20 which may either be printed or electronic. For example, consider the case of negotiating a legal agreement between parties. The parties exchange documents, frequently by email, ending up with an agreed electronic document, the second document 20. A signed printed document 10 is then sent back by the first party. The other party may then wish to check that the printed first document 10 matches the agreed second document 20.

Other instances where it may be useful to compare a printed first document and another document arise in the field of typesetting and printing or in comparing a text that has been scanned and converted by optical character recognition with the original text, to check for errors in the scanning and converting process.

Firstly, an electronic image of the first document and the second document are formed. This is done on the basis of whether each document is a physical or an electronic document. If the document is a physical document, then the document is scanned 110, 112 to create the electronic image 118, 119. If the document is an electronic document, then an electronic image 118,119 is formed 114,116.

The next stage is to perform segmentation 120, 122 on the first and second documents respectively, to identify candidate basic units and their order of occurrence in the documents. This converts each document into respective first and second ordered streams 12, 22 of basic unit images 14, 24. The basic units may be characters, words, lines or paragraphs, for example.

Then, a coarse distance measure between images of the first and second stream is calculated 124 and used 125 to align the respective streams of images. In other words, images in the first stream 12 are matched to images in the second stream 22 where a close match is available.

Note that unlike the case with the compare documents functionality of conventional word processors, images are matched not characters. The method does not require optical character recognition to convert the images into a character or text sequence.

Next, a fine distance between basic units 126 is used to check for fine differences between the matched images 14, 24 from the respective streams. In the case where the basic unit is words, the fine distance step may check for deletions or changes in individual letters, for example.

Then, all the differences are classified and an image 30 is created 130 depicting all changes as differences. This image is then output 132 for example on a computer display or printer.

The approach can use common properties for multiple different scripts, and is not reliant on the use of any particular script or character set. Most scripts are written in lines which are horizontal and straight, line after line, paragraph after paragraph and left to right (or right to left). By using these properties the method is not dependent on the use of a particular script or a single script and does not rely on an optical character recognition engine.

Consider an alternative way of comparing first and second documents. In this alternative, the first document 10 and the second document 20 are scanned in, if printed. Then, the scanned document or documents are converted by optical character recognition and the two texts compared using existing tools as a sequence of words, instead of as a sequence of images.

However, this alternative has a number of limitations. Firstly, scanning the document requires optical character recognition and for many scripts used in the world no optical character recognition engines are available.

Secondly, in some countries multiple scripts may be present in a single document, even on a single page, and optical character recognition cannot in general cope with multiple scripts.

A specific example will now be discussed in more detail. In the specific example, the basic unit is a word.

Figure 2:
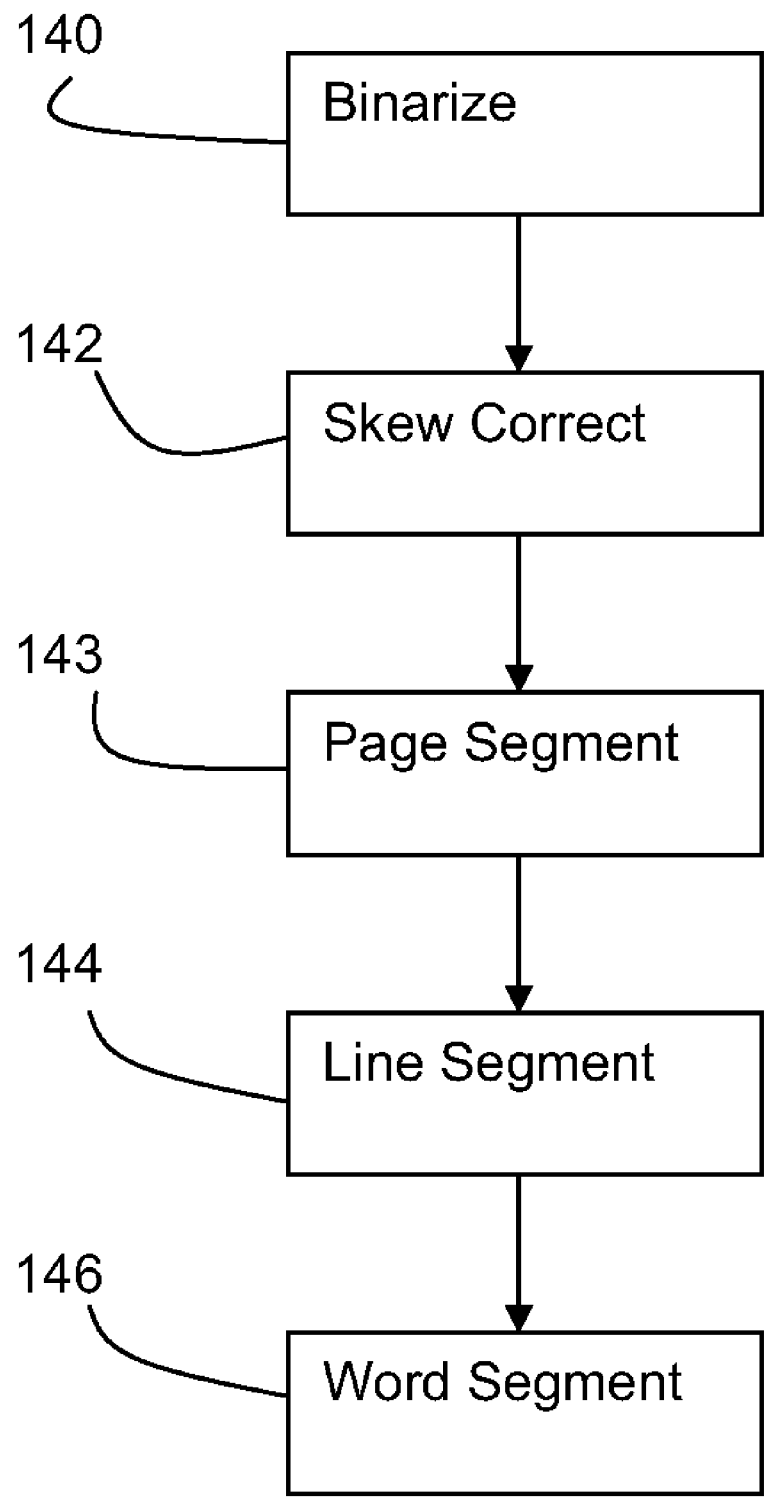
FIG. 2 is a flow diagram showing in more detail basic units segmentation step of FIG. 1.

FIG. 2 illustrates the steps involved in the first step of FIG. 1, image segmentation 120,122, which carries out the same process on the electronic image 118, 119 of both the first and second documents.

As illustrated in FIG. 2, the first step is binarization 140, i.e. converting the image into a pure black and white image.

Next, document skew correction 142 is carried out using any suitable technique to allow coping with slightly misaligned paper or images.

Next, page segmentation 143 is carried out using a suitable page segmentation technique to facilitate extraction of ordered sequence of basic units in the image.

Next, line segmentation 144 is carried out to divide the image into lines parallel to the horizontal lines identified in the previous step.

Next, spaces between parts of the lines are identified to segment 146 the image into words. The output is a sequence 12, 22 of images, each image 14, 24 being corrected for skew and each corresponding to a single word.

Thus, in this case, segmentation takes place in three hierarchical levels. The document image 118,119 is first segmented into intermediate units of pages, then into smaller intermediate units of lines and then into basic units which in the example are words.

Figure 3:
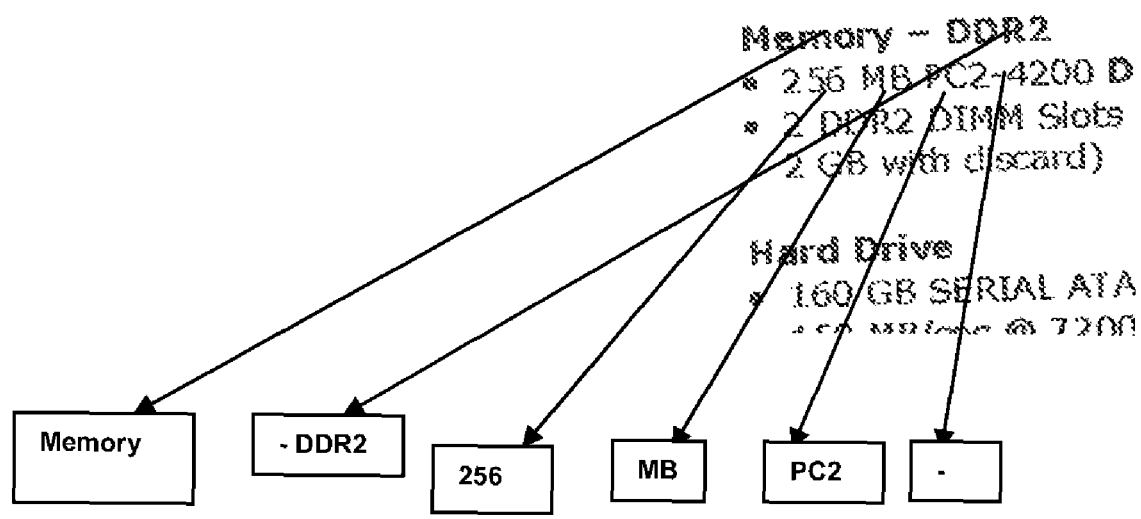
FIG. 3 is an instance of the output of the method of FIG. 2.
Figure 4:
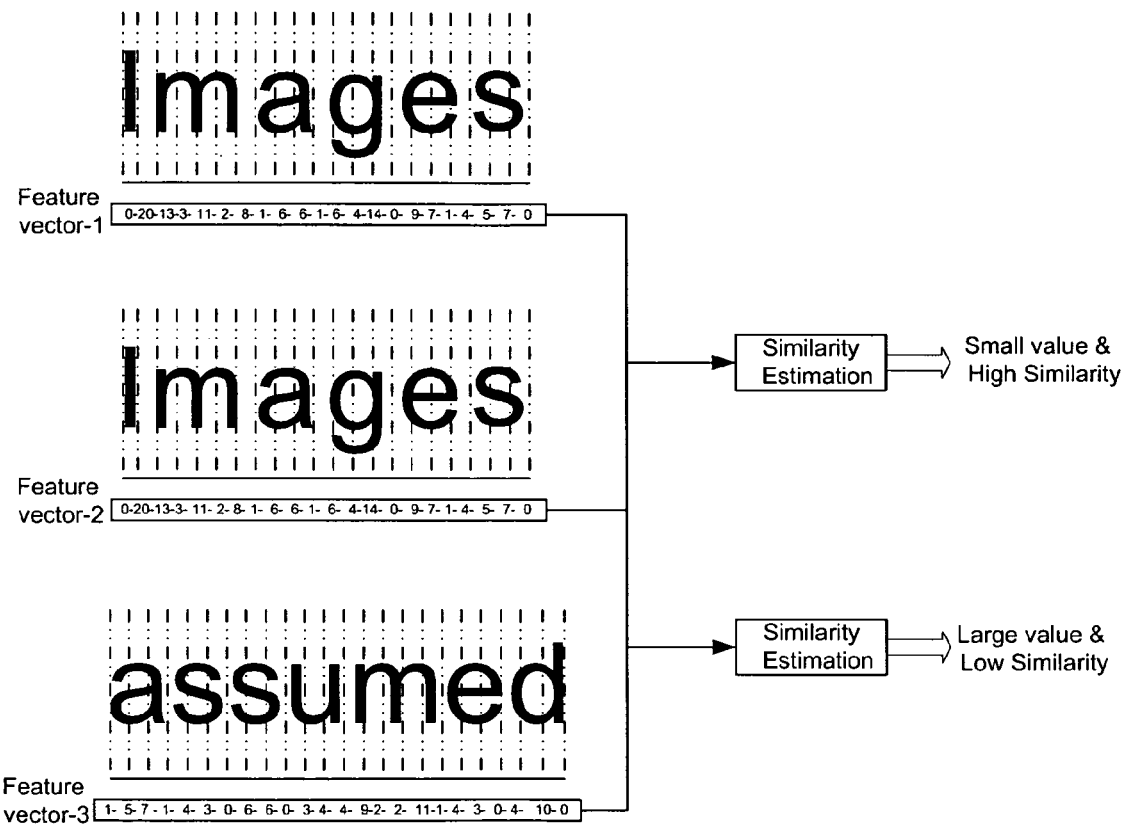
FIG. 4 is an example of coarse distance between basic units.

FIG. 3 illustrates an input image and a corresponding output set of images each corresponding to a single word resulting from the segmentation.

The process is repeated to obtain separate sequences 12,22 of basic unit images, i.e. words, one from the first document 10 and one from the second document 20.

Next, coarse distances between each unit in sequences 12 and 22 are computed 124.

Next, the step of alignment 125 will be described in more detail.

The alignment step is done using dynamic programming, with an algorithm calculating 124 the coarse local distance between a pair of images 14, 24. The coarse local distance algorithm 124 is selected so that the local distance between images of the same words is a minimum, and the more the images differ, the more the local distance increases.

One instance of the coarse distance algorithm for calculating the coarse distance between two words is to divide the words every 10 pixels horizontally, and to count the number of black pixels in the columns. The set of numbers is used as a feature vector for each word. The difference between the feature vectors is used to calculate a length normalised coarse distance, in which the greater the similarity between feature vectors the smaller the value.

The global distance between two sequences of images 12, 22 is calculated using the coarse distances between all pairs of images of the respective sequences.

In the example, the overall measure minimised is the global distance which is the sum of the local distances.

The alignment step also identifies where basic units (in the example words) have been added or deleted and there is no match.

Figure 5:
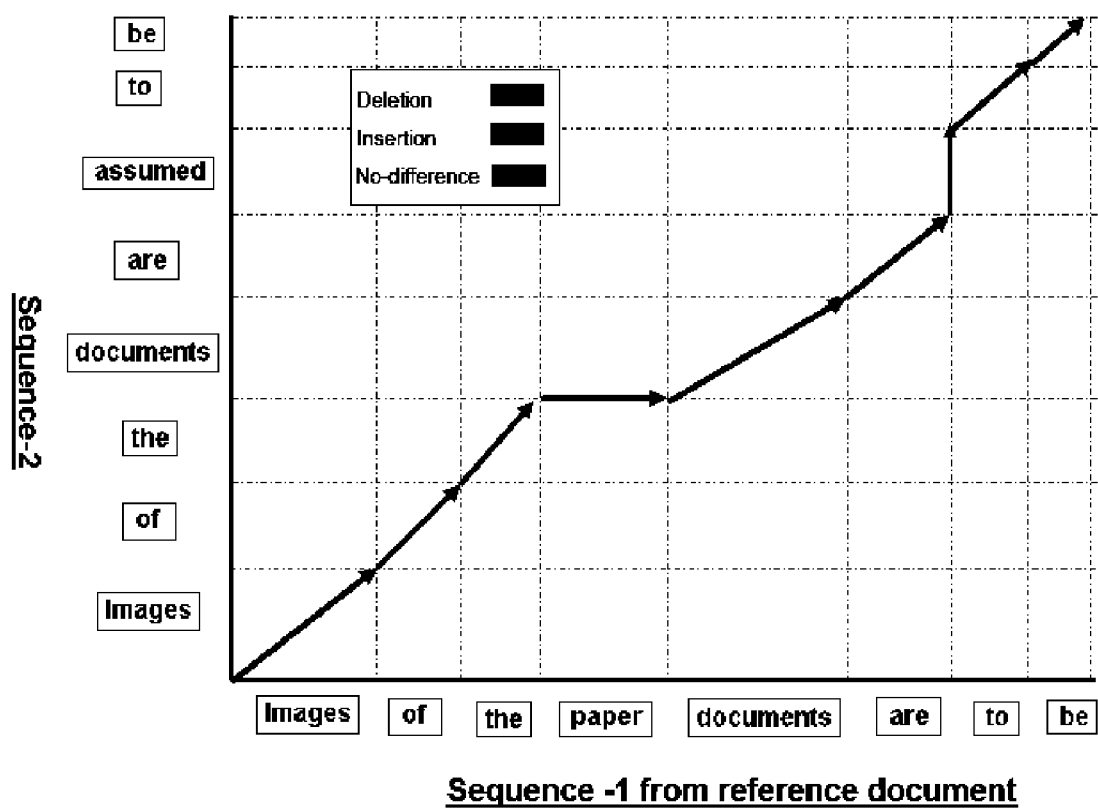
FIG. 5 is an illustration of alignment using dynamic programming.

The algorithm calculates the distance of each basic unit to each other basic unit in sequence. These may conveniently be stored as a matrix, or may be represented as values (not shown) at each crossing of a vertical and horizontal line in FIG. 5. Then, the shortest path, in the sense of the minimum total value from start to end, summing the values along the path, is determined by a dynamic programming algorithm. This shortest path is illustrated by the line of FIG. 5.

Where the shortest path has a basic unit in the first sequence (along the horizontal axis of FIG. 5) that is not matched, in the shortest path, with a basic unit in the second sequence, this is represented by a horizontal line. Conversely, where a basic unit in the second sequence (along the vertical axis of FIG. 5) is not matched, in the shortest path, with a basic unit in the first sequence, this is represented by a vertical line.

Thus, the alignment step 125 essentially matches the words of the first sequence 12 to the words of the second sequence 22 as well as possible.

The fine distance step 126 then checks for differences between matched basic units, in the example words.

In the example, this is done using a similar correlation based distance but at a higher resolution. This step checks for small differences between words.

Then, the identified differences are output in one instance as illustrated in FIG. 6. In this example, the identified word sequences are presented together and differences highlighted by black rectangles.

Figure 7:
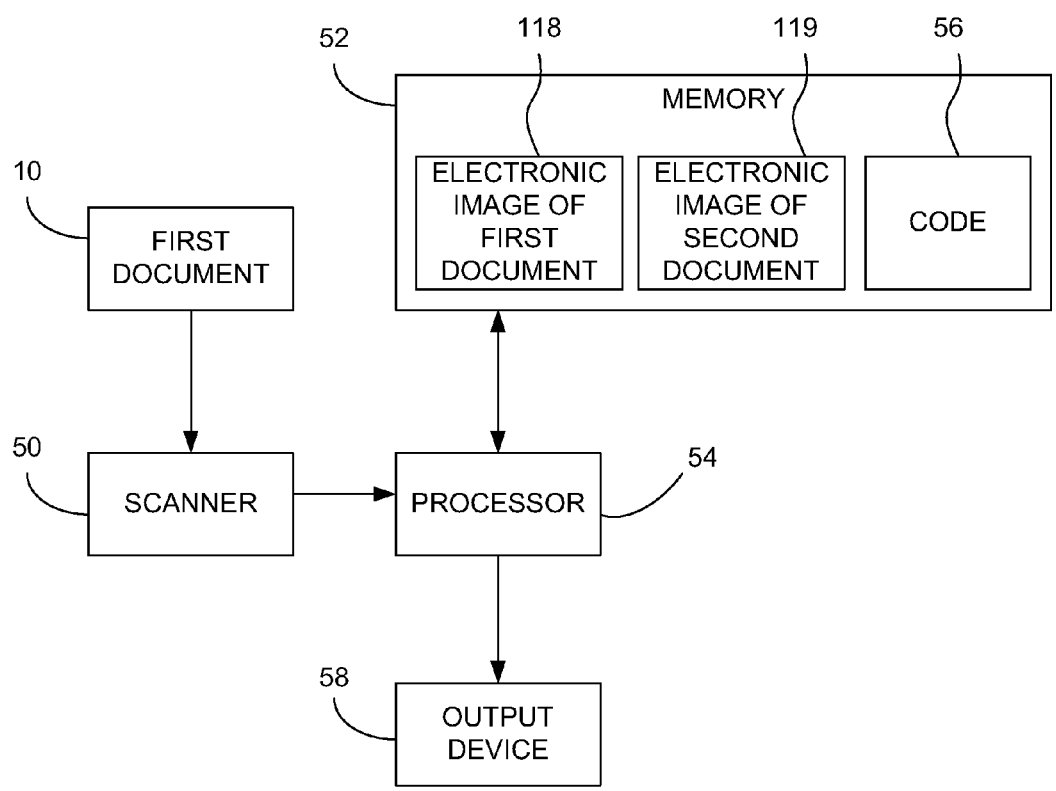
FIG. 7 illustrates apparatus for carrying out the method.

Apparatus suitable for carrying out the method is illustrated in FIG. 7.

The apparatus includes a scanner 50 for scanning in the first and/or second document 10, 20 to create an electronic image. Alternatively, the electronic image can be scanned remotely and transmitted to the place where it is printed and compared. In that case the electronic image 118 is stored directly in memory 52.

A memory 52 stores the electronic image 118 of the scanned first document and the electronic image 119 of the second document, which may also be scanned or which may be generated from an electronic document or which may be received electronically. The memory 52 may be part of a conventional computer also including a processor 54. The memory also contains code 56, which is arranged to cause the computer to carry out the methods as described above.

The processor 54 in combination with code 56 stored in memory 52 thus acts as a means for generating a first sequence of basic unit images from the first document 10 and for generating a second sequence of basic unit images from the second document 20. The code 56 and processor 54 also act as a comparator for comparing the basic unit images of the first sequence with the basic unit images of the second sequence to identify matches between the basic unit images of the first sequence and the basic unit images of the second sequence and hence differences identifying basic units of the first and/or second sequence that do not match and/or for which the difference between matched basic units exceeds a predetermined threshold.

As well as code and a processor, any mixture of hardware and software may be used as the means for generating first and second sequences and as a comparator. One or more separate devices may be used.

An output device 58, here a display, is used to output information about the differences between the first document and the second document. Other suitable output devices such as a printer or even a network connection to pass the differences to a computer elsewhere may also be used.

While specific embodiments have been described herein for purposes of illustration, various modifications will be apparent to a person skilled in the art and may be made without departing from the scope of the invention.

In particular, the alignment step may operate on different sized images to words. The fine distance step may use other measures to determine fine differences between the two units.

Figure 8:
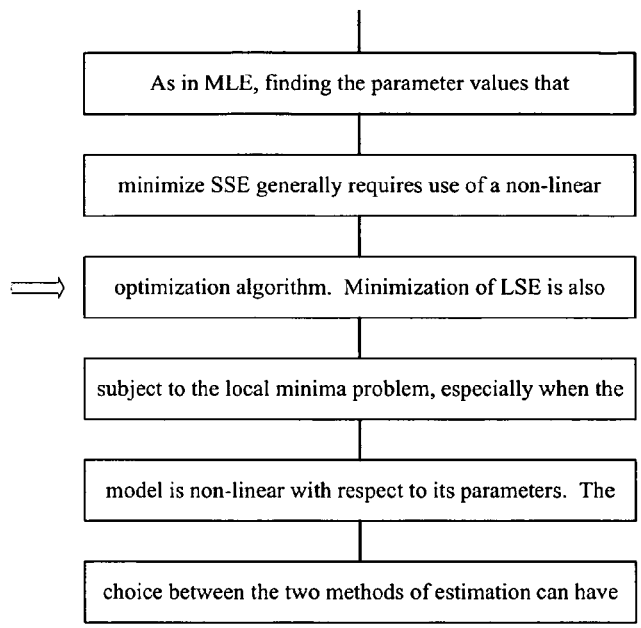
FIG. 8 illustrates an alternative embodiment.

For example, FIG. 8 illustrates an alternative approach to segmentation 120,122 where the basic unit is a line, and the alignment step checks for similarities between lines of documents. This approach is suitable where the first and second documents are formatted and printed in such a way that the text on each line is maintained.

FIG. 9 illustrates a further alternative of segmentation 120, 122 in which the basic unit is a paragraph.

Figure 10:
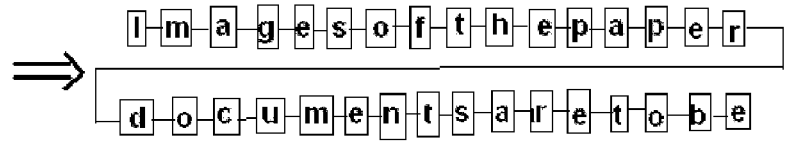
FIG. 10 illustrates a further alternative embodiment.

FIG. 10 illustrated a further alternative of segmentation 120, 122 in which the basic unit is a character.

Note that the embodiment described above uses both line and page segmentation. Alternative embodiments may also include column segmentation, or paragraph segmentation or indeed any segmentation that may be used as a step to divide up the electronic image 118,119 into smaller units.

The segmentation step may also be used to identify images included in the document, i.e. sections that are not text. These images will be ignored for the purposes of identifying differences but could be included in 130 and rendered by 132 for the user to compare them.

A further variation is to change the measure of distance. Any distance measure representing the similarity or dissimilarity between a pair of images may be used.

It will be appreciated that either or both documents may be have writing represented as print on paper, or on any other suitable media, such as board, plastics or any other surface. The printed document may also have changes or handwritten content on it.

The invention claimed is:

1. A method of comparing a first document and a second document, wherein the text of each of the first and second documents can be divided up into basic units, the method comprising:
   generating a first sequence of images of basic units from the first document;
   generating a second sequence of images of basic units from the second document, wherein the basic unit images of the first sequence and the second sequence include characters, words, lines, or paragraphs;
   comparing the basic unit images of the first sequence with the basic unit images of the second sequence to identify matches between the basic unit images of the first sequence and the second sequence and identify differences between the basic unit images of the first sequence and the second sequence, wherein the comparing includes:
   calculating a coarse distance measure between the basic unit images of the first sequence and the second sequence to align the basic unit images; and
   calculating a fine distance measure between aligned basic unit images of the first sequence and the second sequence to identify differences between the aligned basic unit images of the first sequence and the second sequence, wherein the fine distance measure is performed at a higher resolution than the coarse distance measure; and
   outputting information about the differences between the first document and the second document.

2. A method according to claim 1 wherein the step of generating a first sequence of images from the first document comprises:
   de-skewing an image of the first document by identifying horizontal lines of text in the image of the first document; and
   dividing up the image of the first document into lines in the direction of the identified horizontal lines and then dividing up the lines into words in the horizontal direction to obtain the word images.

3. A method according to claim 1 wherein the first document is on a physical medium, the method further comprising scanning the first document to obtain an electronic image of the first document.

4. A method according to claim 1 wherein the step of generating a second sequence of images from the second document comprises:
   deskewing an image of the second document by identifying horizontal lines of text in the image of the second document; and
   dividing up the image of the second document into lines in the direction of the identified horizontal lines and then dividing up the lines into words in the horizontal direction to obtain the word images.

5. A method according to claim 1 wherein the second document is on a physical medium, the method further comprising scanning the second document to obtain an electronic image of the second document.

6. A method according to claim 1,
   wherein the step of generating a first sequence of basic unit images from the first document includes segmenting the first document using a plurality of hierarchical levels to segment the first document into intermediate units and then to segment the intermediate units into basic units; and
   wherein the step of generating a second sequence of basic unit images from the second document includes segmenting the second document using a plurality of hierarchical levels to segment the second document into intermediate units and then to segment the intermediate units into basic units.

7. A method according to claim 1 wherein the aligned basic unit images include words, and the fine distance measure checks for deletions or changes in individual letters.

8. A method according to claim 1 wherein the comparing includes:
   identifying matches between the basic unit images of the first and second sequences, wherein the identifying matches includes minimising a global distance measure as a sum of coarse local distance measures for the basic unit images of the first and second sequences, the coarse local distance measure being a measure of the difference between the basic unit image of the first sequence and the basic unit image of the second sequence.

9. A method according to claim 1 wherein the comparing includes:
   dividing the basic unit images horizontally into columns and counting a number of black pixels in each column, wherein the number of black pixels in each column establishes a feature vector for each basic unit image, and wherein smaller normalised values of the feature vectors represent higher similarity of the basic unit images.

10. A method of comparing a first document and a second document, wherein the text of each of the first and second documents can be divided up into basic units, the method comprising:
    generating a first sequence of images of basic units from the first document;
    generating a second sequence of images of basic units from the second document;
    comparing the basic unit images of the first sequence with the basic unit images of the second sequence to identify matches between the basic unit images of the first sequence and the basic unit images of the second sequence and hence differences identifying basic units of the first and/or second sequence that do not match and/or for which the difference between matched basic units exceeds a predetermined threshold, wherein the step of comparing includes:
    identifying matches between the basic unit images of the first sequence and the basic unit images of the second sequence, wherein the step of identifying matches includes minimising a global distance measure being the sum of coarse local distance measures for the basic unit images of the first and second sequences, the coarse local distance measure being a measure of the difference between the basic unit image of the first sequence and the basic unit image of the second sequence; and calculating the fine distance between matched basic unit images of the first sequence and second sequence to identify fine differences between the matched basic unit images identifying basic units for which the difference between the matched basic units exceeds a predetermined threshold; and outputting information about the differences between the first document and the second document.

11. A method according to claim 10 wherein the step of minimising a global distance measure uses a dynamic programming algorithm.

12. A method according to claim 10 wherein the step outputting includes calculating a fine local distance measure between the matched basic units of the first and second sequences on a finer resolution than the coarse local distance measure used in the step of aligning, and comparing the fine local distance measure with a predetermined threshold.

13. A method according to claim 10 wherein the basic units are words.

14. A method according to claim 13 wherein the step of generating a first sequence of images from the first document comprises:

de-skewing an image of the first document by identifying horizontal lines of text in the image of the first document; and dividing up the image of the first document into lines in the direction of the identified horizontal lines and then dividing up the lines into words in the horizontal direction to obtain the word images.

15. A method according to claim 10 wherein the first document is on a physical medium, the method further comprising scanning the first document to obtain an electronic image of the first document.

16. A method according to claim 13 wherein the step of generating a second sequence of images from the second document comprises:

deskewing an image of the second document by identifying horizontal lines of text in the image of the second document; and dividing up the image of the second document into lines in the direction of the identified horizontal lines and then dividing up the lines into words in the horizontal direction to obtain the word images.

17. A method according to claim 10 wherein the second document is on a physical medium, the method further comprising scanning the second document to obtain an electronic image of the second document.

18. A method according to claim 10, wherein the step of generating a first sequence of basic unit images from the first document includes segmenting the first document using a plurality of hierarchical levels to segment the first document into intermediate units and then to segment the intermediate units into basic units; and wherein the step of generating a second sequence of basic unit images from the second document includes segmenting the second document using a plurality of hierarchical levels to segment the second document into intermediate units and then to segment the intermediate units into basic units.

19. An apparatus for comparing a first document and a second document, wherein each of the first and second documents can be divided up into basic units, the apparatus comprising:

a scanner for scanning a first document on a physical medium to create an electronic image of the first document;

a memory for holding an electronic image of a second document;

a means for generating a first sequence of basic unit images from the first document and for generating a second sequence of basic unit images from the second document, wherein the basic unit images of the first sequence and the second sequence include images of characters, words, lines, or paragraphs;

a comparator for comparing the basic unit images of the first sequence with the basic unit images of the second sequence to identify matches between the basic unit images of the first sequence and the second sequence and identify differences between the basic unit images of the first sequence and the second sequence, wherein the comparing includes:

dividing the basic unit images horizontally into columns and counting a number of black pixels in each column, wherein the number of black pixels in each column establishes a feature vector for each basic unit image, and wherein smaller normalised values of the feature vectors represent higher similarity of the basic unit images; and an output device for outputting information about the differences between the first document and the second document.

20. An apparatus according to claim 19 wherein the comparing includes:

calculating a coarse distance measure between the basic unit images of the first sequence and the second sequence to align the basic unit images; and calculating a fine distance measure between aligned basic unit images of the first sequence and the second sequence to identify differences between the aligned basic unit images of the first sequence and the second sequence, wherein the fine distance measure is performed at a higher resolution than the coarse distance measure.

* * * * *